US009410567B2

(12) United States Patent
Swanson et al.

(10) Patent No.: US 9,410,567 B2
(45) Date of Patent: Aug. 9, 2016

(54) SYSTEM FOR CONNECTING AND ALIGNING A MULTIPLE PIECE CATWALK TROUGH

(71) Applicant: FORUM US, INC., Houston, TX (US)

(72) Inventors: Gregory David Swanson, Magnolia, TX (US); Joe Rodney Berry, Cypress, TX (US)

(73) Assignee: FORUM US, INC., Houston, TX (US)

( * ) Notice: Subject to any disclaimer, the term of this patent is extended or adjusted under 35 U.S.C. 154(b) by 127 days.

(21) Appl. No.: 14/207,073

(22) Filed: Mar. 12, 2014

(65) Prior Publication Data

US 2014/0270904 A1 Sep. 18, 2014

Related U.S. Application Data

(60) Provisional application No. 61/780,457, filed on Mar. 13, 2013.

(51) Int. Cl.
| | |
|---|---|
| *F16G 11/00* | (2006.01) |
| *F16B 7/00* | (2006.01) |
| *F16B 5/02* | (2006.01) |
| *F16B 19/02* | (2006.01) |

(52) U.S. Cl.
CPC . *F16B 7/00* (2013.01); *F16B 5/025* (2013.01); *F16B 19/02* (2013.01); *Y10T 29/49895* (2015.01); *Y10T 403/1624* (2015.01)

(58) Field of Classification Search
CPC ............... Y10T 403/1624; Y10T 403/1633; Y10T 403/49895; E21B 19/15; F16B 7/00; F16B 5/025; F16B 19/02
USPC ............... 403/14, 15, 24, 101, 102, 345, 346, 403/378, 398
See application file for complete search history.

(56) References Cited

U.S. PATENT DOCUMENTS

| | | | | |
|---|---|---|---|---|
| 2,019,755 | A |  | 11/1935 | Zerbe et al. |
| 2,527,097 | A | * | 10/1950 | Katow .................... B66F 19/00 254/8 R |
| 2,726,123 | A | * | 12/1955 | Mathews ................. E04C 2/42 137/342 |
| 3,256,552 | A | * | 6/1966 | Sterner ................... E05D 3/022 16/273 |
| 3,472,475 | A | * | 10/1969 | Rudiger .................. E01D 21/00 248/228.1 |
| 4,285,097 | A | * | 8/1981 | Kondo ................. H01H 23/143 16/441 |
| 4,790,047 | A | * | 12/1988 | Myslicki .................. E05D 5/10 16/273 |
| 4,806,042 | A | * | 2/1989 | Swank ..................... F16B 3/00 403/101 |
| 4,899,611 | A | * | 2/1990 | Pinna ...................... B62D 1/20 180/400 |
| 5,263,810 | A |  | 11/1993 | Takekata et al. |
| 5,295,558 | A | * | 3/1994 | Cooperman ............ E04G 1/151 182/222 |
| 5,360,313 | A |  | 11/1994 | Gilmore, Jr. et al. |
| 5,456,483 | A | * | 10/1995 | Madsen ............ B62D 53/0871 280/432 |
| 6,158,087 | A |  | 12/2000 | Cheung |

(Continued)

OTHER PUBLICATIONS

PCT International Search Report and Written Opinion for Application PCT/US2014/025626, dated Sep. 25, 2014.

*Primary Examiner* — Gregory Binda
*Assistant Examiner* — Nahid Amiri
(74) *Attorney, Agent, or Firm* — Patterson & Sheridan, L.L.P.

(57) ABSTRACT

A system for connecting and aligning pieces of a catwalk trough that prevents sagging of the catwalk trough at a connection point between at least two pieces of the catwalk trough by applying a force to the pieces to counteract any separation forces.

17 Claims, 13 Drawing Sheets

(56) References Cited

U.S. PATENT DOCUMENTS

| | | |
|---|---|---|
| 6,379,075 B1 | 4/2002 | Shamblin et al. |
| 6,550,795 B1 | 4/2003 | Schlosser et al. |
| 8,007,025 B2 * | 8/2011 | Kohr ................ E05D 5/043 |
| | | 296/146.11 |
| 8,801,041 B2 * | 8/2014 | Barrett ................ B60R 3/005 |
| | | 137/267 |
| 9,016,249 B2 * | 4/2015 | Roberts ................ F01L 1/08 |
| | | 123/90.16 |

* cited by examiner

SYSTEM FOR CONNECTING AND ALIGNING A MULTIPLE PIECE CATWALK TROUGH

CROSS REFERENCE TO RELATED APPLICATIONS

This application claims benefit of U.S. Provisional Patent Application No. 61/780,457, filed Mar. 13, 2013, the contents of which are herein incorporated by reference in their entirety.

BACKGROUND OF THE INVENTION

1. Field of the Invention

Embodiments of the invention generally relate to catwalks for conveying pipe to a drill floor from a lower section of a drilling rig or drill site. Specifically, embodiments of the invention relate to a system for connecting parts of the trough of a catwalk when the trough consists of two or more pieces.

2. Description of the Related Art

In a drilling operation or rig work-over operation, whether on a water-based or land-based drilling rig, pipe for the drilling operation, casing, or other tubulars are often stored at or supplied from a level that is lower than the drill floor. Operators typically use a "catwalk" to convey the pipe from the lower level to the drill floor. The pipe is typically mechanically transported (e.g. pushed and/or pulled) in a v-shaped trough, from a level below the rig floor to the rig floor.

In certain onshore rigs the catwalk can be one-hundred feet long or longer. One of the problems with catwalks of this size is that they cannot easily be moved on or off the rig location, and cannot be transported on public roads unless they are sixty feet long or less. Accordingly, it would be useful to have catwalk troughs that could be divided into two or more pieces so that they could be more easily transported from location to location.

A potential problem with a two-piece catwalk trough is that the trough would be likely to sag at the point where the two sections are attached as a result of the weight of the tubular at points below the connection point of the two trough pieces. This would create stress on the trough parts at the point where they are connected as well as creating a potentially dangerous situation for workers located near the catwalk and trough. Accordingly, it would be useful to have a system for connecting and aligning a two piece trough so that the trough will not sag as pipe is transported to the drill floor and so that undue stress will not be placed on each part of the trough.

SUMMARY OF THE INVENTION

Embodiments of the invention provide a system for connecting and aligning the pieces of a catwalk trough when the catwalk consists of two or more pieces.

BRIEF DESCRIPTION OF THE DRAWINGS

So that the manner in which the above recited aspects of the invention can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 10 also shows a cross section of the hydraulic cylinder for preventing sag between the two sections.

DETAILED DESCRIPTION

Figure 1A:
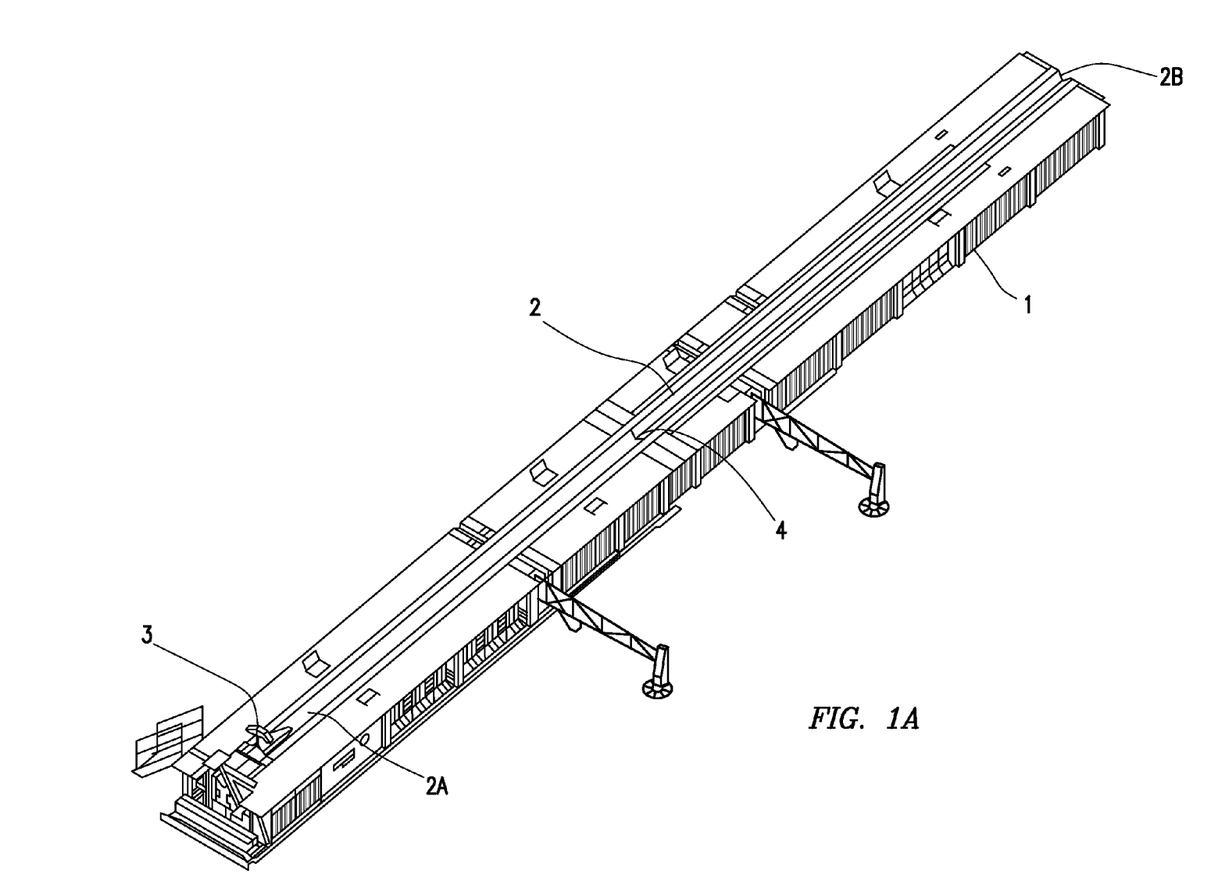
FIG. 1A shows an embodiment of the invention in the position in which pipe is loaded onto the catwalk and into the trough or unloaded from the trough.

FIG. 1A shows trough 2 in its lowered position in catwalk 1 for conveying pipe to a drill floor. Pipe is loaded into trough 2 so that skate 3 may advance pipe from trough piece 2A toward trough piece 2B and a drill floor. Trough pieces 2A and 2B are connected at connection point 4.

Figure 1B:
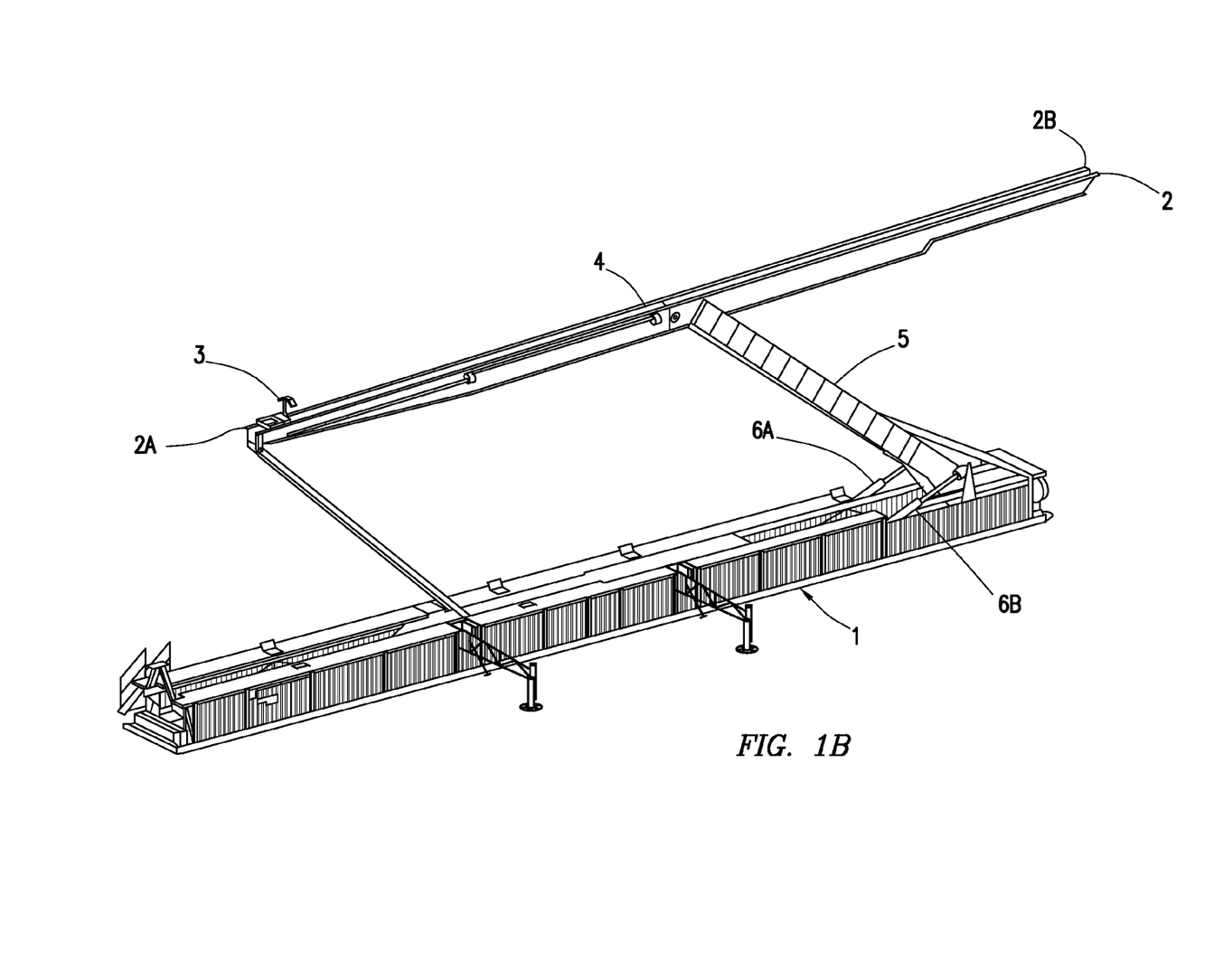
FIG. 1B shows an embodiment of the invention in the position in which the trough is in the process of being raised to the drill floor level.

FIG. 1B shows trough 2 in the process of being raised toward a drill floor by leg 5 that is raised by hydraulic cylinders 6A and 6B. Skate 3 would be moving pipe along trough 2 through trough piece 2A and toward trough piece 2B. Without the embodiments of the invention described herein, trough pieces 2A and 2B would tend to sag at connection point 4 when a pipe section is on trough piece 2A.

Figure 1C:
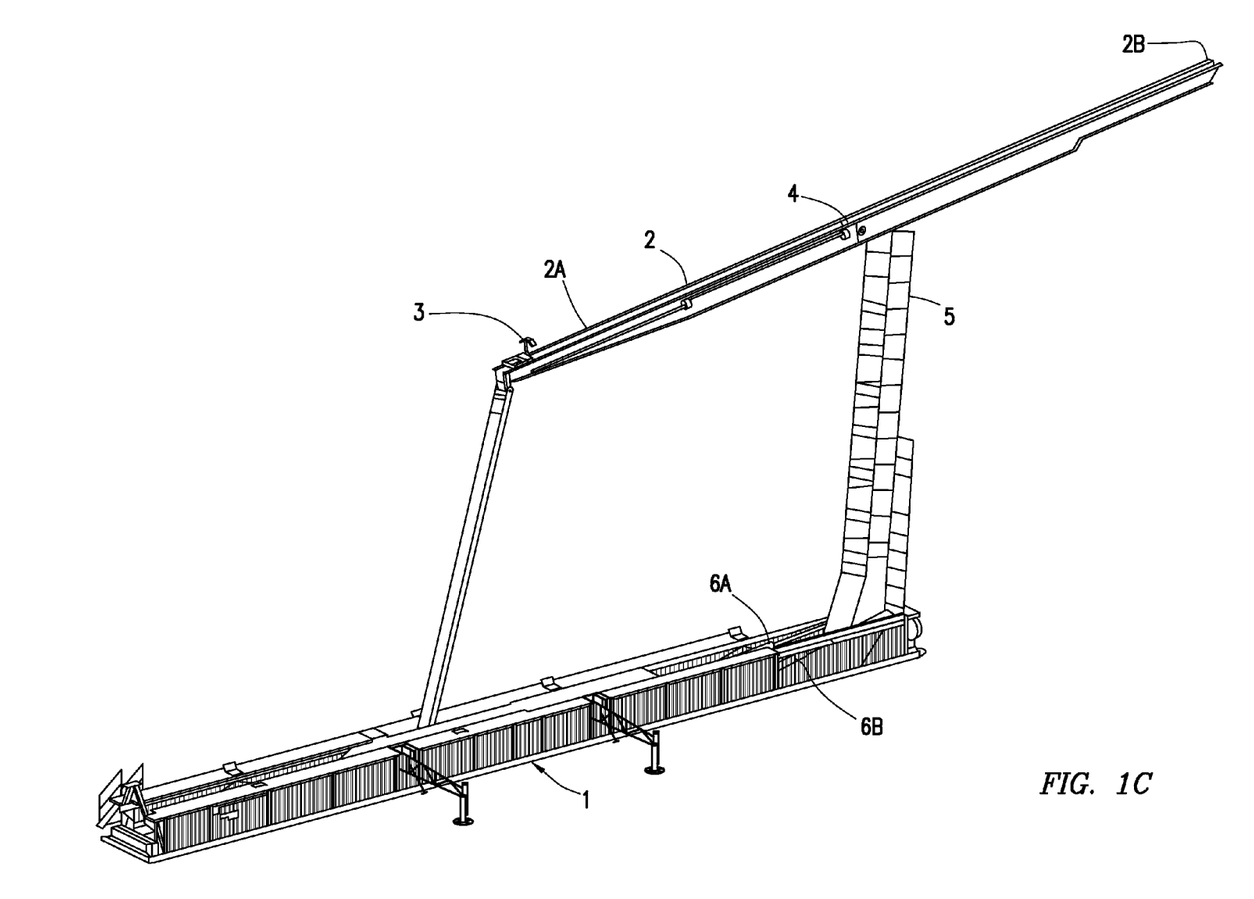
FIG. 1C shows the trough in an elevated position in which pipe is being conveyed to or from the drill floor.

FIG. 1C shows trough 2 fully raised where trough piece 2B would be adjacent to a drill floor. Skate 3 advances pipe to the end of trough piece 2B so that the pipe can be removed from the trough 2 by the crew on the drill floor and moved toward a rotary or into a setback area on the drill floor.

Figure 2:
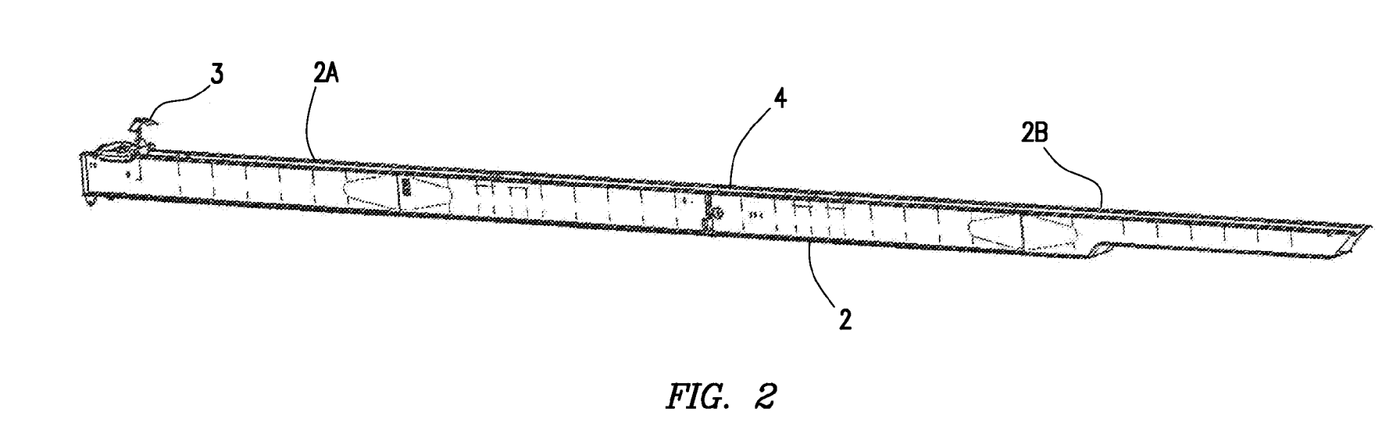
FIG. 2 shows a wide-view of the two-part trough, in which the connection point between the two parts of the trough is shown.

FIG. 2 is a side view of the two-piece trough 2. The two pieces 2A, 2B could be of different lengths, depending on the overall length of the trough 2 and the needs for transportation of the catwalk and trough parts to or between drilling locations. If needed or desired for convenience or because of the overall length of the trough 2, the trough 2 could be designed to be comprised of more than two sections. Connection point 4 is the point at which the two sections of trough 2 in the pictured embodiment, lower piece 2A and upper piece 2B, meet.

Figure 3:
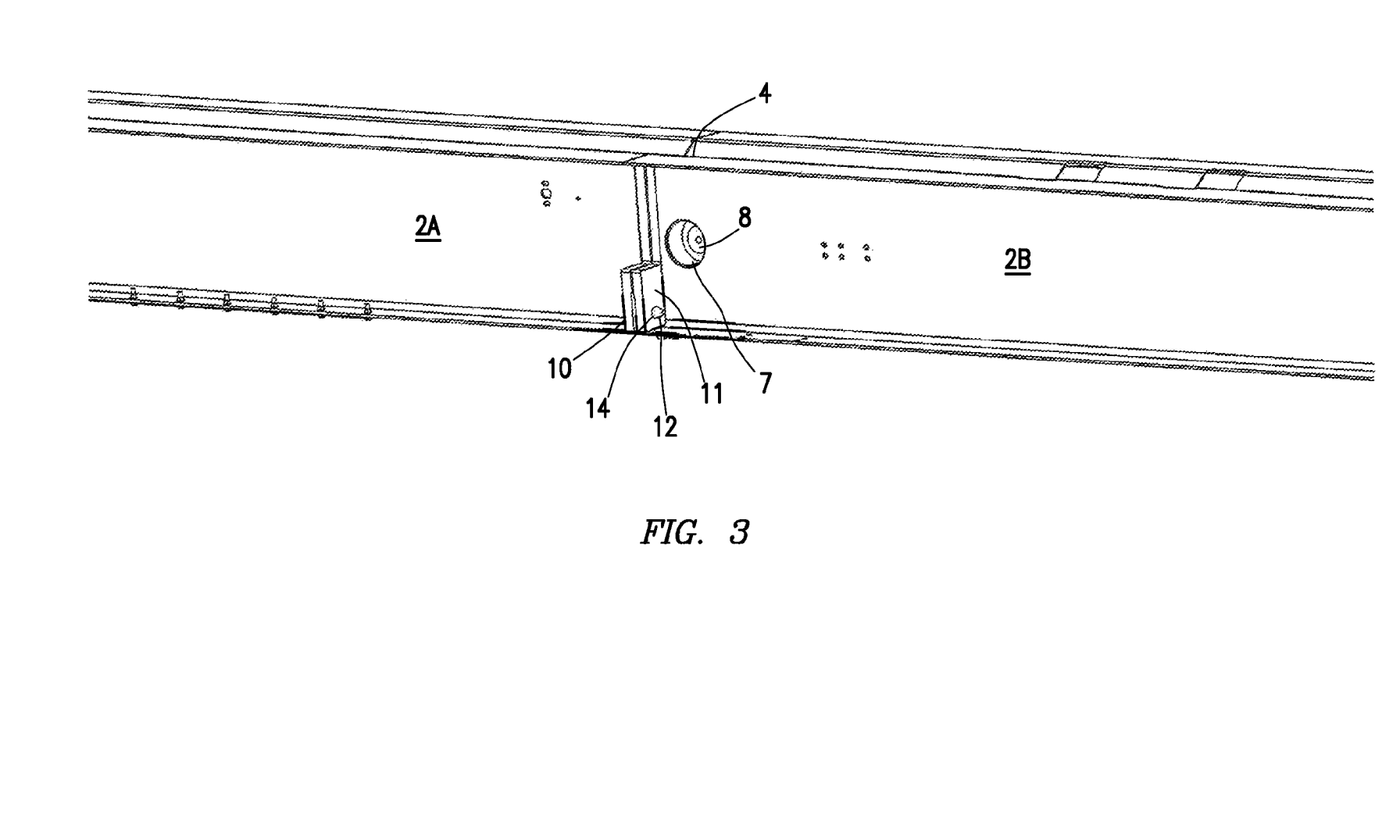
FIG. 3 shows a closer view of the two-part trough, in which the connection point between the two parts of the trough is shown.

FIG. 3 is a closer view of one side of connection point 4 for lower trough piece 2A and upper trough piece 2B. Hole 7 in the upper trough piece 2B allows for the insertion and removal of pin 8 from the connector described in FIGS. 5-10 below. FIG. 3 also shows pin 12 from connector piece 10 installed in hole 14 in connector piece 11.

Figure 4:
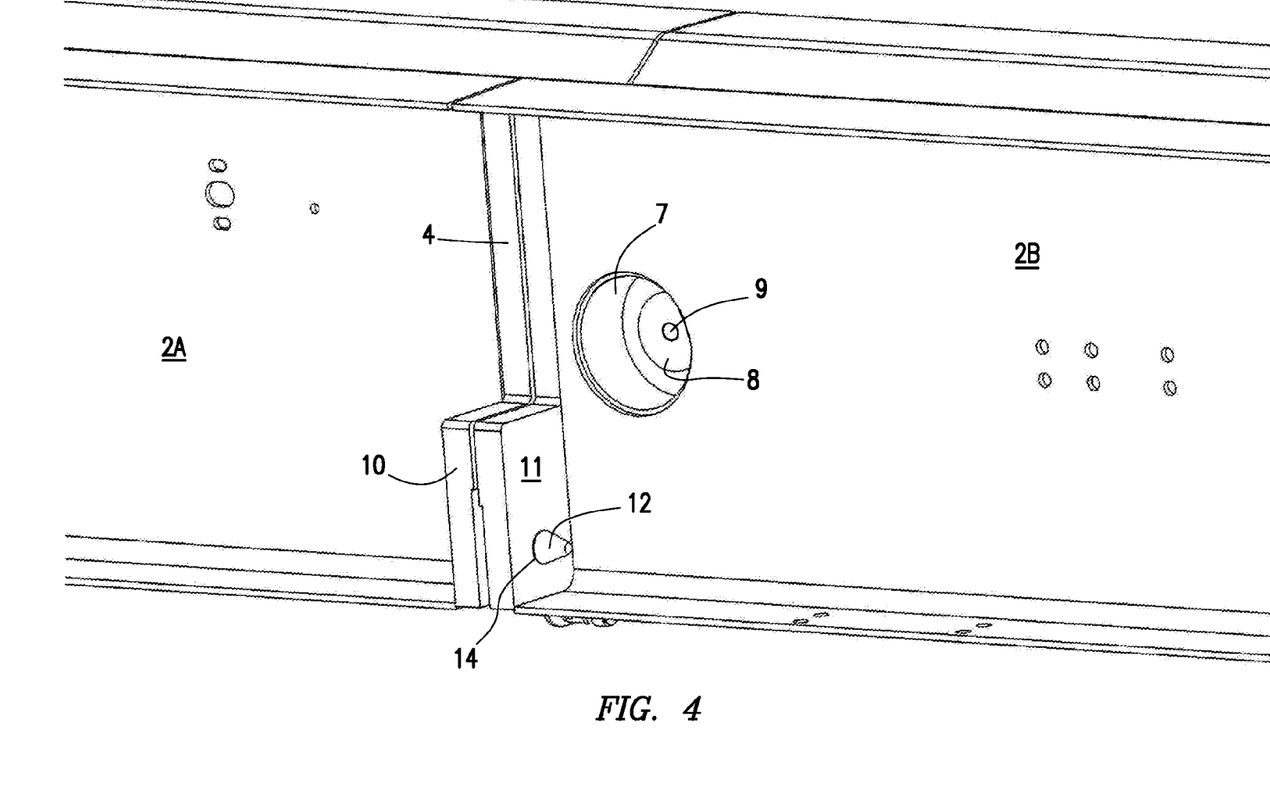
FIG. 4 shows an up-close view of the connection point between the two parts of the catwalk trough.

FIG. 4 is a detailed version of FIG. 3 which shows the features highlighted in the description of FIG. 3 above, including pin 8 disposed in hole 7 of the upper trough piece 2B, and pin 12 disposed in hole 14 of connector piece 11. FIG. 4 also shows hole 9, centered in pin 8. Hole 9 is threaded and allows for the insertion of a threaded rod that assists with the installation and removal of pin 8.

Figure 5:
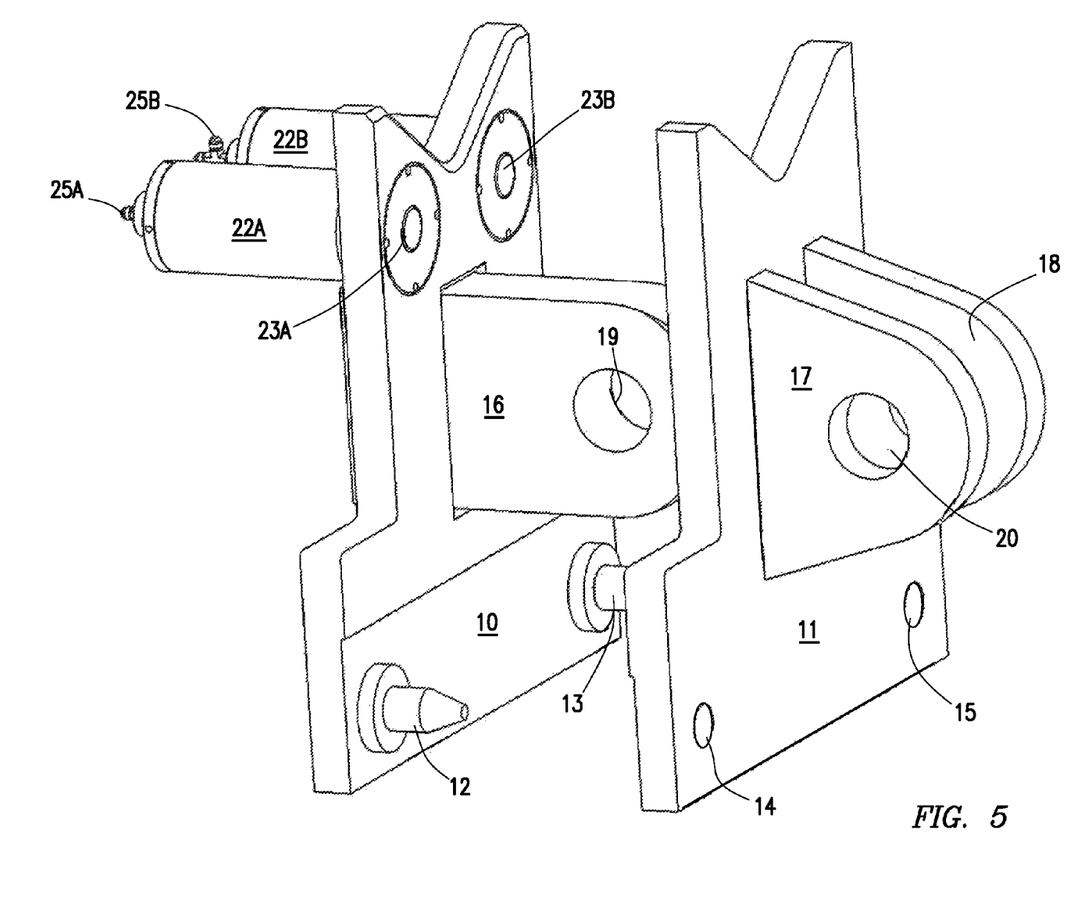
FIG. 5 is a side view of the connector pieces for connecting the two parts of the trough in a detached state.

FIG. 5 is a side view of the connector for the two pieces 2A, 2B of the trough 2, consisting of connector pieces 10 and 11. Pins 12 and 13 fit into holes 14 and 15 respectively to aid in the connection and alignment of connector pieces 10 and 11. Depressions 50 (illustrated in FIG. 8) in connector piece 11 accommodate the raised bases of pins 12 and 13. Boss 16 from connector piece 10 slides between bosses 17 and 18 of connector piece 11. The sliding of boss 16 between bosses 17 and 18 (through slot 24 illustrated in FIG. 6) results in the alignment of hole 19 from boss 16 with hole 20 from boss 17 and hole 21 from boss 18 (further illustrated in FIG. 6). In one embodiment, the diameter of holes 19-21 are about 4 inches. Pin 8, also with a diameter of about 4 inches, can be positioned in holes 19-21 to hold connector pieces 10 and 11 together. Piston assemblies 22A and 22B, which are attached to connector piece 10, contain pistons 23A and 23B respectively, which can provide a bias against connector piece 11 when the two connector pieces 10, 11 are connected.

Figure 6:
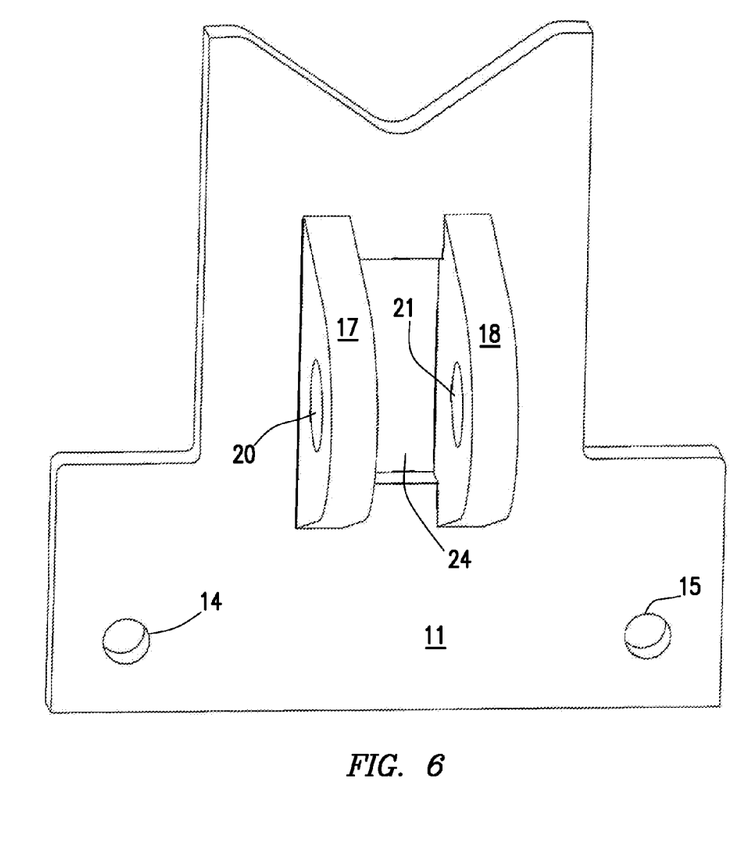
FIG. 6 is a different view of the connector for the drill floor side trough piece, showing the rectangular hole between the two bosses of the piece through which the boss of the other piece is inserted.

FIG. 6 is a view of connector piece 11 for trough piece 2B. Slot 24 is rectangular in shape and accommodates the insertion of boss 16 of connector piece 10 between bosses 17 and 18 of connector piece 11. Holes 14 and 15 of connector piece 11 accommodate the insertion of pins 12 and 13 from connector piece 10.

Figure 7:
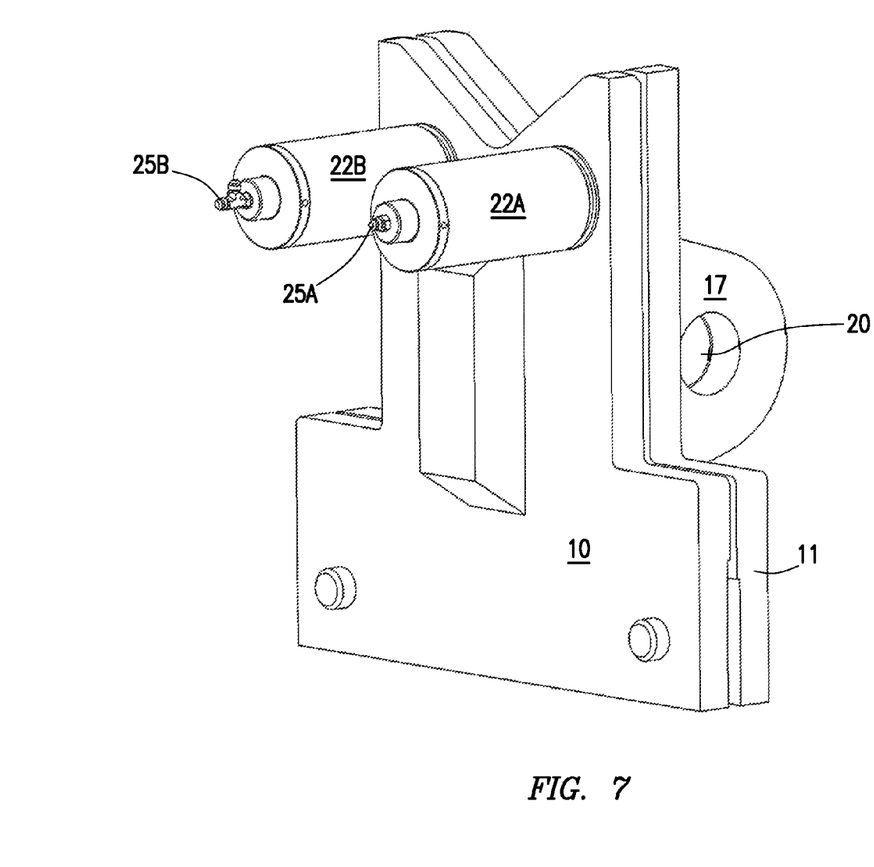
FIG. 7 is a view of the two connector pieces in their connected position.

FIG. 7 is a view of connector pieces 10 and 11 in a connected position. Hydraulic adapters 25A and 25B provide hydraulic fluid to hydraulic cylinders 22A and 22B respectively.

Figure 8:
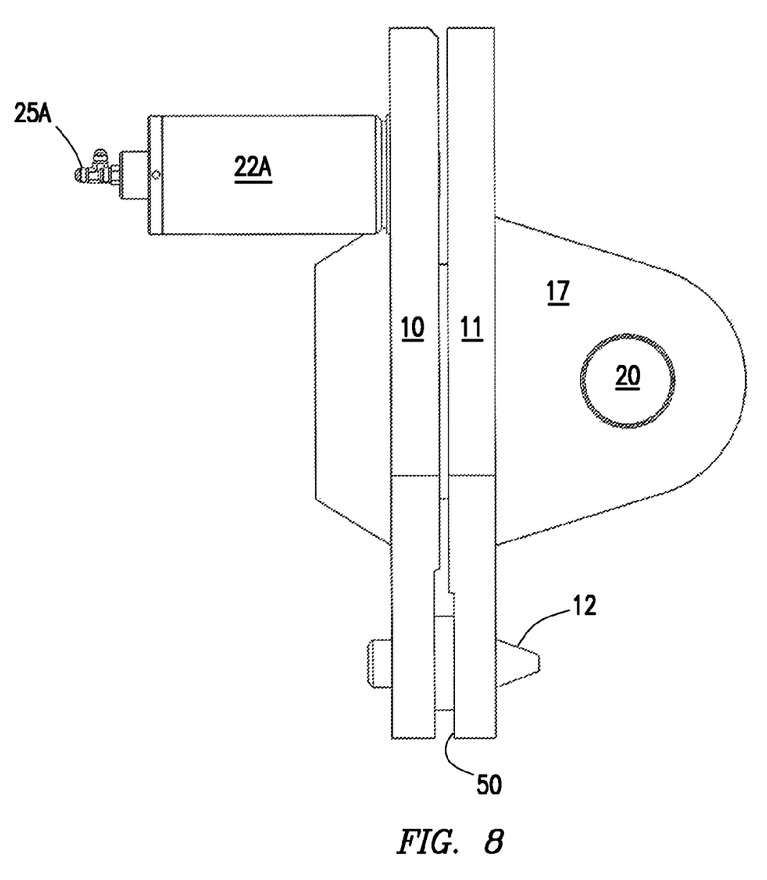
FIG. 8 is another view of the two connector pieces in their connected position.
Figure 9:
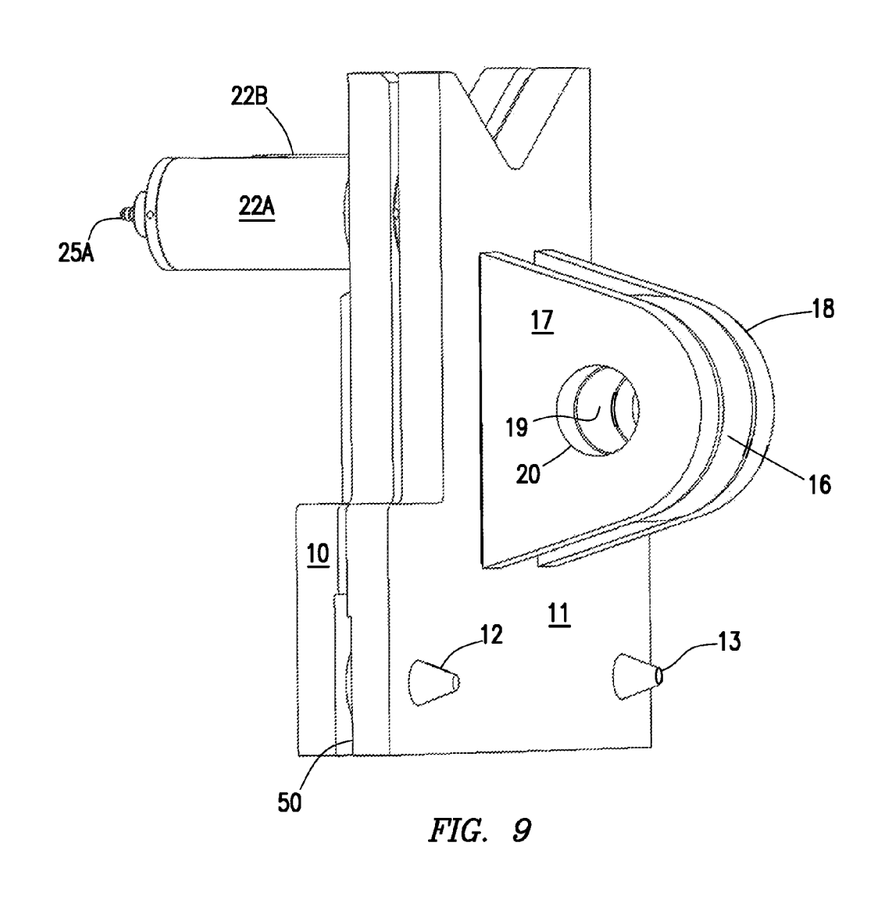
FIG. 9 is another view of the two connector pieces in their connected position.

FIG. 8 is a side view of connector pieces 10 and 11 in a connected position. FIG. 8 shows depression 50 in connector piece 11 for accommodating the base of pin 12. FIG. 9 is another view of connector pieces 10 and 11 in a connected position.

Figure 10:
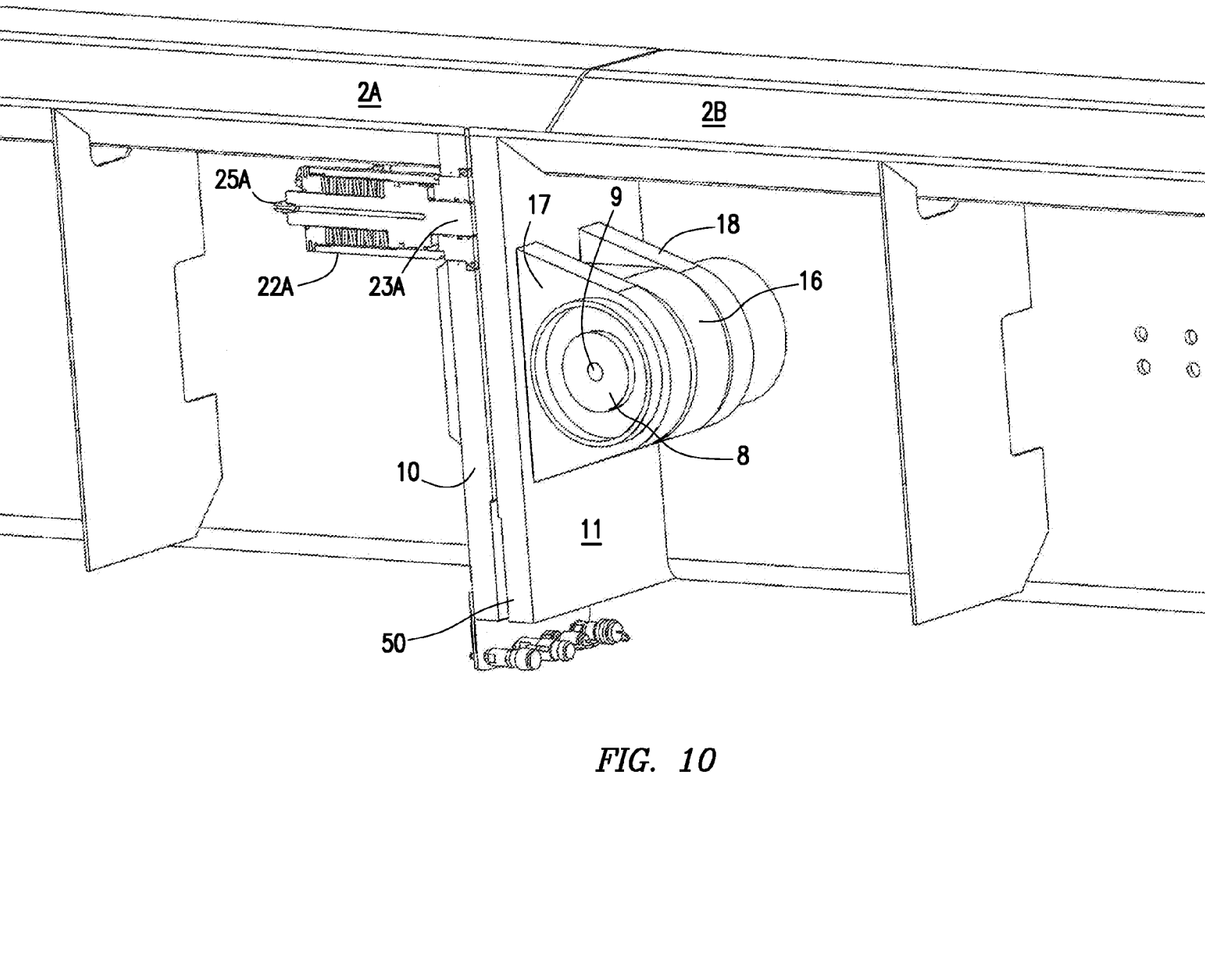
FIG. 10 is a cross-section side view of the connector pieces for connecting the two parts of the trough in its connected position within the catwalk interior.

FIG. 10 is a cross section of the connector pieces 10 and 11 in a position in which trough pieces 2A and 2B are connected together. As illustrated, boss 16 of connector piece 10 is disposed between bosses 17, 18 of connector piece 11, and pin 8 is disposed through aligned holes 19-21 formed by the bosses 16-18. FIG. 10 also shows a cross section of hydraulic cylinder 22A with piston 23A, which are identical to hydraulic cylinder 22B and piston 23B.

Figure 11:
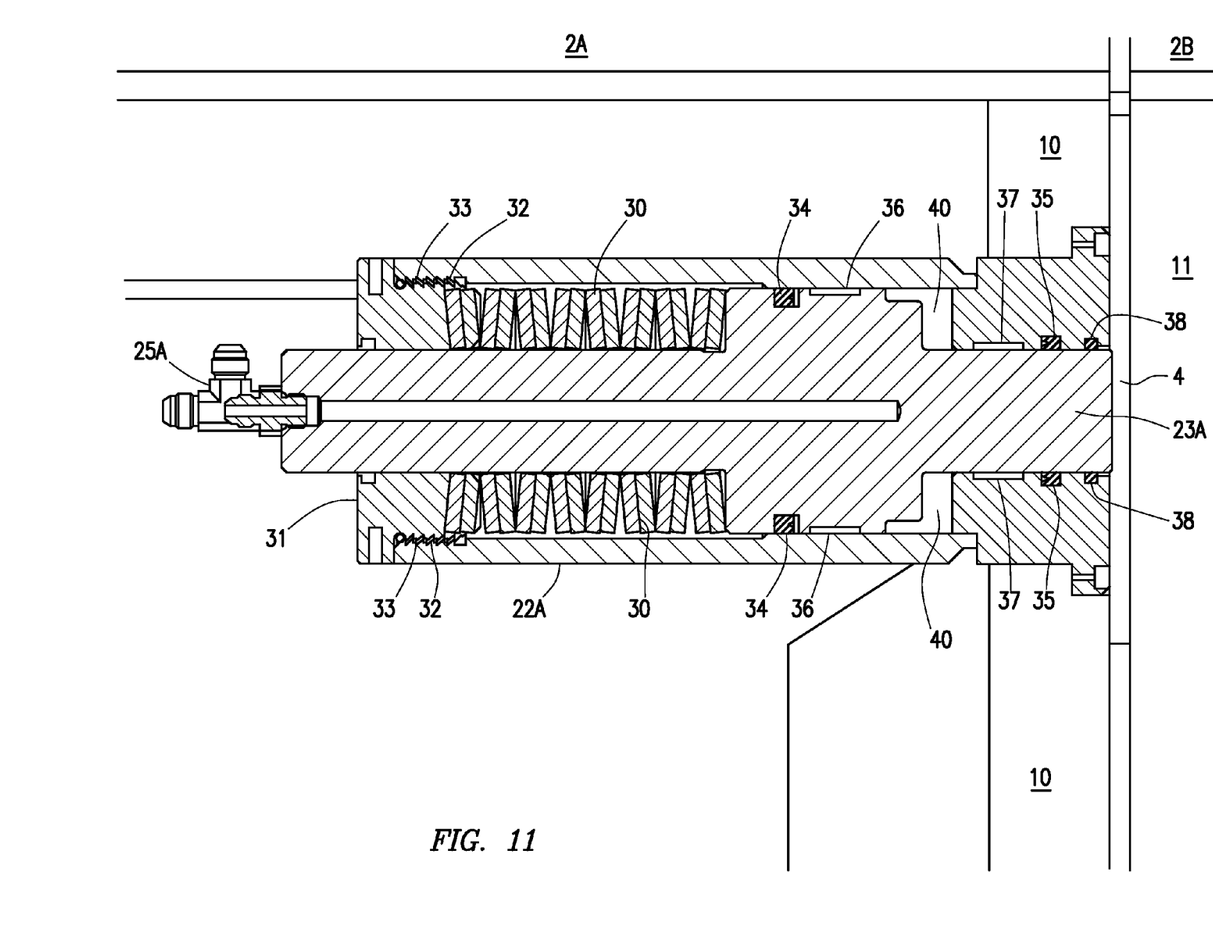
FIG. 11 is a cut-away cross section view of the spring-loaded pistons shown in FIGS. 5 & 7-10.

Additional detail of hydraulic cylinder 22A is shown in FIG. 11. Spring 30 is inside cylinder 22A. A threaded insert 31 with threads 32 engage threads 33 of hydraulic cylinder 22A. The hydraulic cylinder 22A in one embodiment also includes ring seals 34 and 35, wear rings 36 and 37, and wiper ring 38. Spring 30 forces piston 23A of connector piece 10 to apply pressure to the face of connector piece 11 when tubulars are being advanced along trough 2 of catwalk 1 so that trough pieces 2A and 2B will not sag at connection point 4. Without the pressure applied by pistons 23A and 23B, when a section of pipe is in trough piece 2A, trough pieces 2A and 2B would tend to sag, separating toward the bottom of connection point 4 and coming together near the top of connection point 4. By applying pressure to the face of connector piece 11, pistons 23A and 23B substantially eliminate the sagging of trough pieces 2A and 2B by counteracting the separation at the lower end of the connection point 4.

When the operator desires to disconnect the two pieces 2A, 2B of the trough 2, hydraulic fluid is pumped through hydraulic adapter 25A, through fluid passage 39, through any additional fluid passages running approximately perpendicular to fluid passage 39 and into chamber 40. The fluid pressure acting on piston 23A compresses spring 30 and causes piston 23A to stop applying pressure to the face of connector piece 11 as illustrated in FIG. 11. The force from piston 23B is similarly relieved. This causes a slight sag between trough pieces 2A and 2B. Pin 8 is removed from holes 19-21. The two trough pieces 2A and 2B are separated by removing pins 12 and 13 from holes 14 and 15 at the same time that boss 16 is removed from between bosses 17 and 18.

Embodiments of the invention could also be used to connect more than two sections of a catwalk trough. For instance, if a catwalk trough were made from three or more pieces to further aid with transportation of the catwalk from location to location, the embodiments of the invention could be used to connect a middle section of the trough to both a lower and upper section.

While the foregoing is directed to embodiments of the invention, other and further embodiments of the invention may be devised without departing from the basic scope thereof, and the scope thereof is determined by the claims that follow.

The invention claimed is:

1. A connection system for connecting sections of a catwalk trough for conveying tubulars to a drill floor, comprising:
    a first connection piece having a pin member and a first boss member;
    a second connection piece having a first opening disposed through the second connection piece and configured to receive the pin member, a second opening disposed through the second connection piece and configured to receive the first boss member, and a second boss member; and
    a pin insertable into holes formed in the first boss member and the second boss member that align when the first boss member is inserted into the second opening and disposed through the second connection piece to form a rigid connection.

2. The system of claim 1, wherein the second connection piece includes a pair of second boss members such that the first boss member is disposed between the pair of second boss members when inserted into the second opening of the second connection piece.

3. The system of claim 2, wherein the second opening of the second connection pieces is a rectangular shaped slot.

4. The system of claim 1, further comprising a piston assembly coupled to the first connection piece and configured to apply a force to the second connection piece.

5. The system of claim 4, wherein the piston assembly includes a pair of pistons configured to apply the force to the second connection piece.

6. The system of claim 4, wherein the piston assembly includes a spring that forces a piston into engagement with the second connection piece.

7. The system of claim 6, wherein pressurized fluid supplied to a chamber of the piston assembly applies a force to compress the spring.

8. The system of claim 1, wherein the pin member is inserted into the first opening of the second connection piece when the first boss member is inserted into the second opening of the second connection piece.

9. A method of connecting sections of a catwalk trough for conveying tubulars to a drill floor, comprising:

inserting a pin member of a first connection piece into a first opening disposed through a second connection piece;

inserting a first boss member of the first connection piece into a second opening disposed through the second connection piece such that the first boss member is disposed through the second connection piece so that a hole formed in the first boss member aligns with a hole formed in a second boss member of the second connection piece; and inserting a pin into the holes of the first boss member and the second boss member when aligned to connect the first connection piece to the second connection piece to form a rigid connection.

10. The method of claim 9, wherein the second connection piece includes a pair of second boss members such that the first boss member is disposed between the pair of second boss members when inserted into the second opening of the second connection piece.

11. The method of claim 10, wherein the second opening of the second connection pieces is a rectangular shaped slot.

12. The method of claim 9, further comprising applying a force to the second connection piece using a piston assembly that is coupled to the first connection piece.

13. The method of claim 12, wherein the piston assembly includes a pair of pistons configured to apply the force to the second connection piece.

14. The method of claim 13, further comprising forcing the pistons into engagement with the second connection piece using a spring.

15. The method of claim 14, further comprising supplying pressurized fluid into a chamber of the piston assembly to force the pistons to compress the spring.

16. The method of claim 9, further comprising connecting an upper trough piece to a lower trough piece by connecting the first connection piece to the second connection piece.

17. The method of claim 16, further comprising applying a force to the second connection piece using a piston assembly that is coupled to the first connection piece to prevent the upper trough piece from separating from the lower trough piece when connected by the first connection piece and the second connection piece.

* * * * *